United States Patent [19]

Judd

[11] 4,179,490
[45] Dec. 18, 1979

[54] PREPARATION OF PURE MAGNESIAN VALUES

[75] Inventor: George G. Judd, Woodville, Ohio

[73] Assignee: Woodville Lime & Chemical Company, Woodville, Ohio

[21] Appl. No.: 936,109

[22] Filed: Aug. 23, 1978

Related U.S. Application Data

[63] Continuation of Ser. No. 732,528, Oct. 14, 1976, abandoned, which is a continuation-in-part of Ser. No. 628,093, Nov. 3, 1975, abandoned.

[51] Int. Cl.$^2$ .................................................. C01F 5/24
[52] U.S. Cl. .................................... 423/165; 423/430
[58] Field of Search ................. 423/164, 165, 169, 430

[56] References Cited

U.S. PATENT DOCUMENTS 3,402,017  9/1968  Ruiz ...................................... 423/165

Primary Examiner—O. R. Vertiz
Assistant Examiner—Wayne A. Langel
Attorney, Agent, or Firm—John C. Purdue

[57] ABSTRACT

The recovery of a magnesium carbonate of high purity from an aqueous slurry comprising a mixture of calcium carbonate and hydrated magnesium carbonate is disclosed. Carbon dioxide is introduced into the slurry while the temperature thereof is maintained not higher than about 40° C. to produce an appreciable concentration of magnesium cations in the water of the slurry. Introduction of carbon dioxide is discontinued while most of the calcium is present as the carbonate. Solids are then separated from the aqueous solution of magnesium cations which is produced. Also disclosed is the removal, e.g., by means of a vacuum pump, of carbon dioxide from the aqueous solution of magnesium cations to precipitate magnesium carbonate and the separation of precipitated magnesium carbonate from the aqueous phase. The aqueous slurry comprising a mixture of calcium carbonate and hydrated magnesium carbonate can be produced by charging a reaction vessel with water and particulate material containing a mixture of at least one calcium compound including calcium oxide and at least one magnesium compound including magnesium oxide, bubbling carbon dioxide into the vessel for reaction to produce calcium and magnesium carbonates, separating solids including calcium carbonate and hydrated magnesium carbonate from the associated aqueous phase, controlling temperature of the reaction mixture prior to the separation of calcium and magnesium carbonates so that substantially all of the magnesium ions are present as hydrated magnesium carbonate at the time of separation, and slurrying the separated solids with water.

2 Claims, No Drawings

PREPARATION OF PURE MAGNESIAN VALUES

REFERENCE TO RELATED APPLICATION

This is a continuation of pending application Ser. No. 732,528, filed Oct. 14, 1976, now abandoned, which application, in turn, was a continuation-in-part of my copending application Ser. No. 628,093, filed Nov. 3, 1975, now abandoned.

BACKGROUND OF THE INVENTION

What have been denominated "magnesium bicarbonate processes" have been suggested* for the separation of lime and magnesia from mixtures, e.g., dolomite. For example, what has been called the "Pattinson process" involves calcining dolomite, slaking the calcine to form a milk of dolomite, classifying the milk of dolomite to remove impurities, and treating the classified milk of dolomite with washed and compressed kiln gases to precipitate calcium carbonate and form soluble magnesium bicarbonate. The calcium carbonate is then recovered by filtration. The filtrate is boiled for a short time to precipitate basic magnesium carbonate, which, in turn, is recovered by filtration. So far as is known, however, neither the Pattinson process nor any variation thereof which has previously been suggested has been capable of producing a high purity calcium carbonate or magnesium carbonate.
*See, for example, a Bureau of Mines publication entitled "Economic Considerations in the Recovery of Magnesia From Dolomite", August, 1943.

The Bureau of Mines publication also teaches that finely divided dolomite could be carbonated to separate the anhydrous magnesium carbonate from the calcium carbonate. However, in practice it is so much easier to bring the magnesia of calcined dolomite into solution as the bicarbonate, than to dissolve the anhydrous magnesium carbonate in raw dolomite, that the cost of calcination is justified.

It has also been suggested* that the calcium carbonate sludge recovered any filtration in the Pattinson process includes magnesian values which can be recovered by re-slurrying the sludge, carbonating, and then recycling the liquor at the slaking step. By this recycling, the plant capacity for production of magnesium products may be increased but the purity of the magnesium carbonate remains the same as in the Pattinson process.
*U.S. Pat. No. 2,373,528.

DESCRIPTION OF PREFERRED EMBODIMENTS

The method of the instant invention will be apparent to those skilled in the art from the following Example which constitutes the best mode presently known to the inventor.

EXAMPLE

A one liter beaker was charged with 500 ml. water at about 20° C. and 120 g. dust from a dolomitic lime kiln. The dust, which was removed from the gaseous effluent from the kiln by an electrostatic precipitator, contained 38.38 percent* CaO and 28.01 percent MgO, both on an oxide basis, and had a sulfur content of 0.676 percent, a loss on ignition of 31.62 percent. The calcium and magnesium compounds actually present in the dust were not determined quantitatively, but were found to include the oxides, hydroxides, sulfates and carbonates. The aqueous slurry in the beaker was agitated with a propeller-type agitator and carbon dioxide, a total of 75 grams, was bubbled into the stirred aqueous slurry. Exothermic reaction between the carbon dioxide and calcium and magnesium compounds from the dust raised the temperature of the stirred slurry of about 57° C. Precipitate which formed was then separated from the aqueous phase by filtration, and a 95 gram portion of the precipitate was resuspended in about one liter of water. The resulting aqueous suspension was agitated with a propeller-type agitator and carbon dioxide, a total of 14.9 grams was bubbled thereinto at a rate sufficiently slow that the temperature of the slurry did not exceed 25° C. The precipitate which remained after the second carbonation was separated from the aqueous solution by filtration. The remainder of the precipitate from the first carbonation was then suspended in about one liter of water and agitated while carbon dioxide, a total of 14.3 grams was bubbled therethrough at a rate sufficiently slow that the temperature of the reaction mixture did not exceed 25° C. The precipitate which remained was separated from the aqueous solution by filtration, and the filtrate was combined with that from the previous low-temperature carbonation. The combined filtrate was then placed in a bell jar which was evacuated by a vacuum pump to an absolute pressure of about 100 mm. mercury. A white precipitate formed in the solution within the bell jar. After about thirty minutes the bell jar was disconnected from the vacuum pump and the white precipitate which had formed under vacuum was recovered by filtration. The precipitate, a total of about 74 grams, contained 99.8 percent of magnesium carbonate ($MgCO_3$), 0.18 percent of calcium carbonate ($CaCO_3$) and a trace of sulfur.
*The terms "percent" and "parts" are used herein and in the appended claims to refer to percent and parts by weight, unless otherwise indicated.

It will be appreciated that the precipitator dust used as a starting material in the foregoing Example is particularly advantageous in practicing the method of the instant invention. However, other starting materials, e.g., burned dolomite, can also be used. When burned dolomite is the starting material, it is preferably finer than about 30 mesh, U.S. Sieve Series.

Producing two different slurries, as in the process described in the foregoing Example, contributes to the purity of the final product. When the precipitator dust was suspended in water for the first, high temperature carbonation, water soluble impurities were dissolved, and were discarded with the filtrate after the calcium carbonate and hydrated magnesium carbonate precipitates had been separated from the aqueous phase. The precipitate recovered after the first carbonation is not necessarily of high purity, because any water-insoluble impurities in the original starting material are a part thereof. However, both water-insoluble impurities and calcium carbonate remain insoluble during the second carbonation step and are, therefore, separated from the magnesium bicarbonate solution by filtration before processing of that solution is completed.

It will be appreciated that both calcium carbonate and hydrated magnesium carbonate could be converted to the soluble bicarbonates during the second, low-temperature carbonation step. According to the instant invention, this carbonation is discontinued while most of the calcium is present as calcium carbonate; it is the control of this second carbonation step that enables the recovery of extremely pure magnesium carbonates. For some ultimate uses, e.g., in the refractories art, it is desirable to have some CaO present with the magnesium compound, usually, the oxide. For example, burned magnesite refractories used in oxygen steel making vessels have frequently had up to about two and one-half percent CaO. When the method of the instant invention is being practiced to produce a magnesium compound to be used in producing such refractories, the second, low-temperature carbonation can be carried farther to introduce the required amount of a calcium compound.

It will be appreciated that the method of the instant invention can be practiced continuously. For example, a precipitator can be charged with water and dust from a dolomitic lime kiln in about the proportions set forth in the foregoing Example, and kiln gas can be bubbled through the resulting slurry to provide both heat and carbon dioxide. After about thirty minutes, additions of water and of dolomitic lime kiln dust, in the same proportions, can be commenced at a rate which will provide an average residence time of about thirty minutes in the precipitator. At the same time, withdrawals of slurry from the precipitator can be commenced at a rate which will maintain a constant level in the precipitator. The withdrawn slurry can be introduced into a thickener of such size that it requires about one hour to fill to its working level. After one hour, withdrawals of water (overflow) and sludge (underflow) from the thickener can be commenced, and continued at rates which maintain both the composition and the charge in the thickener substantially constant. The overflow is discharged from the system as waste or recycled, while the underflow is charged to a carbonator, together with about 10½ parts cold water per part of sludge. The carbonator can be sized so that, at the rates of charging being used, it requires about thirty minutes to fill. Carbon dioxide from a source which is subsequently described is bubbled into the carbonator to dissolve the hydrated magnesium carbonate therein as the bicarbonate. Insufficient carbon dioxide is used to dissolve all of the hydrated magnesium carbonate, the exact stoichiometry depending upon the composition desired in the final product. Since this is, in essence, an acid base titration, carbonation can be controlled to give the pH at which the dissolved material has the desired composition, e.g., essentially magnesium bicarbonate or magnesium bicarbonate plus a desired proportion of calcium bicarbonate.

What I claim is:

1. A method for recovering a magnesium carbonate of very high purity from a composition containing at least one calcium compound and at least one magnesium compound, which method comprises the steps of producing an aqueous slurry consisting of a mixture of precipitated calcium carbonate, precipitated hydrated magnesium carbonate, water insoluble impurities and water, introducing carbon dioxide into the slurry while maintaining the temperature thereof not higher than about 40° C. until there is an appreciable concentration of magnesium cations in the water of the slurry, discontinuing the carbon dioxide introduction while most of the calcium is present as calcium carbonate, separating solids from the aqueous solution of magnesium cations which results, removing carbon dioxide from the aqueous solution of magnesium cations to precipitate hydrated magnesium carbonate, and separating precipitated hydrated magnesium carbonate from the aqueous phase.

2. A method as claimed in claim 1 wherein the aqueous slurry consisting of a mixture of precipitated calcium carbonate, precipitated hydrated magnesium carbonate, water insoluble impurities and water is produced by charging to a reaction vessel water and particulate material containing a mixture of at least one calcium compound including calcium oxide and at least one magnesium compound including magnesium oxide, introducing carbon dioxide into the vessel for reaction to produce calcium carbonate and hydrated magnesium carbonate, separating solids including calcium carbonate and hydrated magnesium carbonate from the associated aqueous phase, controlling temperature of the reaction mixture, prior to the separation of calcium carbonate and hydrated magnesium carbonate, so that substantially all of the magnesium ions ae present as hydrated magnesium carbonate at the time of separation, and producing the aqueous slurry by slurrying the separated solids with water.

* * * * *